(12) United States Patent
Takegawa

(10) Patent No.: US 9,692,608 B2
(45) Date of Patent: Jun. 27, 2017

(54) COMMUNICATION MANAGEMENT APPARATUS, PROGRAM, COMMUNICATION MANAGEMENT METHOD, AND COMMUNICATION MANAGEMENT SYSTEM

(71) Applicant: Hiroshi Takegawa, Tokyo (JP)

(72) Inventor: Hiroshi Takegawa, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 14 days.

(21) Appl. No.: 14/551,193

(22) Filed: Nov. 24, 2014

(65) Prior Publication Data

US 2015/0150105 A1 May 28, 2015

(30) Foreign Application Priority Data

Nov. 27, 2013 (JP) .................................. 2013-244634

(51) Int. Cl.
| | | |
|---|---|---|
| H04L 12/18 | (2006.01) | |
| G06F 21/62 | (2013.01) | |
| G06F 21/31 | (2013.01) | |
| H04L 29/06 | (2006.01) | |

(52) U.S. Cl.
CPC ...... *H04L 12/1822* (2013.01); *G06F 21/6218* (2013.01); *G06F 21/31* (2013.01); *G06F 2221/2145* (2013.01); *H04L 63/08* (2013.01); *H04L 63/083* (2013.01); *H04L 63/10* (2013.01); *H04L 63/102* (2013.01); *H04L 63/104* (2013.01)

(58) Field of Classification Search
CPC ................. G06F 21/31; G06F 21/6218; G06F 2221/2145; H04L 12/1822; H04L 63/08; H04L 63/083; H04L 63/10; H04L 63/102; H04L 63/104
See application file for complete search history.

(56) References Cited

U.S. PATENT DOCUMENTS

| | | | |
|---|---|---|---|
| 6,047,288 A * | 4/2000 | Kurosawa | ............... G06Q 10/10 |
| 8,743,022 B2 | 6/2014 | Masuda et al. | |
| 2003/0145052 A1* | 7/2003 | Watanabe | ........... H04L 12/1813 |
| | | | 709/204 |
| 2003/0229623 A1* | 12/2003 | Chang | ................. G06F 21/6218 |
| 2004/0125933 A1* | 7/2004 | Jun | ......................... H04M 3/56 |
| | | | 379/202.01 |

FOREIGN PATENT DOCUMENTS

| | | |
|---|---|---|
| JP | 2003-333559 | 11/2003 |
| JP | 2012-108872 | 6/2012 |

* cited by examiner

*Primary Examiner* — Morshed Mehedi
*Assistant Examiner* — Ayoub Alata
(74) *Attorney, Agent, or Firm* — Harness, Dickey & Pierce, P.L.C.

(57) ABSTRACT

A communication management apparatus for performing access control over a plurality of terminal devices is provided. The communication management apparatus includes a registration unit that accepts registration of a group of terminal devices to be granted permission of access among the plurality of terminal devices; and an access control unit that performs access control, if authentication information is set in association with the group in group information having information about the group, to permit access from one terminal device of the group of the terminal devices that supplies an input that matches the authentication information.

15 Claims, 16 Drawing Sheets

FIG.4

| GROUP ID | NAME | PASSWORD |
|---|---|---|
| G01 | S PROJECT DIVISION | XXXX |
| G02 | DEVELOPMENT DIVISION | YYYY |
| G03 | DEVELOPMENT SECTION FOR PRODUCT A | AAAA |
| G04 | DEVELOPMENT SECTION FOR PRODUCT B | |
| G05 | SALES DIVISION | ZZZZ |
| G06 | T PROJECT DIVISION | TTTT |
| ⋮ | ⋮ | ⋮ |

FIG.5

| CONFERENCE ID | NAME | START DATE AND TIME | CONFERENCE STATUS | PASSWORD TO HOLD | PASSWORD TO PARTICIPATE | PARTICIPANT GROUP ID | DOCUMENT ID |
|---|---|---|---|---|---|---|---|
| M01 | BOARD MEETING | 2013/10/10 13:00 | OPEN | PASS_XXXX | PASS_YYYY | NONE | |
| M02 | PRODUCT A RELEASE PERMISSION MEETING | 2013/10/10 14:00 | BEFORE | AAAA | NONE | G03, G05 | |
| M03 | PRODUCT B SALES PERSONNEL MONTHLY MEETING | 2013/10/12 09:30 | BEFORE | NONE | NONE | G05 | |
| M04 | T PROJECT DIVISION POLICY BRIEFING | 2013/10/15 15:00 | BEFORE | TTTT | NONE | G06, G01 | |
| ...... | ...... | ...... | | ...... | ...... | ...... | ...... |

FIG.6

| DOCUMENT ID | NAME | STORAGE LOCATION |
|---|---|---|
| D01 | SUMMARY OF BUDGET FOR FISCAL 2013 | file://10.101.0.2/doc/summary of budget for fiscal 2013.doc |
| D02 | SALES STRUCTURE | file://10.101.0.2/doc/sales structure of product A.doc |
| D03 | BUSINESS NEGOTIATIONS STATUS IN 2013/9 | file://10.101.0.2/doc/business negotiations status 201309.xls |
| D04 | T PROJECT DIVISION'S POLICY IN LATTER HALF OF FISCAL 2013 | file://10.101.10.13/doc/policy briefing for latter half of 2013.ppt |
| ...... | ...... | ...... |

FIG. 7

NEW CONFERENCE REGISTRATION

● INPUT INFORMATION ABOUT A CONFERENCE TO REGISTER
INFORMATION

| CONFERENCE NAME | BOARD MEETING | | |
|---|---|---|---|
| START DATE AND TIME | 2013/10/10 | | 13:00 |
| PASSWORD TO HOLD | ...... | INPUT AGAIN | |
| PASSWORD TO PARTICIPATE | ...... | INPUT AGAIN | |
| PARTICIPANT GROUP | | | |

DOCUMENTS

| DOCUMENT NAME | |
|---|---|
| SUMMARY OF BUDGET FOR FISCAL 2013 | |

[ADD]  [CHANGE]  [DELETE]

[SAVE]

FIG. 9

CONFERENCE MANAGEMENT/LIST OF CONFERENCES

● CONFERENCES SATISFYING SPECIFIED CONDITIONS CAN BE RETRIEVED

SEARCH CONDITIONS

CONFERENCE ID /CONFERENCE NAME

START DATE AND TIME [ ] [PREVIOUS DAY] [NEXT DAY]

CONFERENCE STATE ⊙ ALL ○ OPEN ○ BEFORE ○ NOT TO BE HELD

SEARCH RESULT

| CONFERENCE ID | CONFERENCE NAME | START DATE AND TIME | CONFERENCE STATUS |
|---|---|---|---|
| M01 | BOARD MEETING | 2013/10/10 13:00 | OPEN |
| M02 | PRODUCT A RELEASE PERMISSION MEETING | 2013/10/10 14:00 | BEFORE |
| M03 | PRODUCT B SALES PERSONNEL MONTHLY MEETING | 2013/10/12 09:30 | BEFORE |
| M04 | T PROJECT DIVISION POLICY BRIEFING | 2013/10/25 15:00 | BEFORE |
| ⋮ | ⋮ | ⋮ | ⋮ |

[DETAILS OF CONFERENCE] [PARTICIPATE]   ◁ PREVIOUS 10 ITEMS   1-8/8   NEXT 10 ITEMS ▷

FIG.12

| GROUP ID | NAME | PARENT GROUP ID | PASSWORD |
|---|---|---|---|
| G01 | S PROJECT DIVISION | NONE | XXXX |
| G02 | DEVELOPMENT DIVISION | G01 | YYYY |
| G03 | DEVELOPMENT SECTION FOR PRODUCT A | G02 | AAAA |
| G04 | DEVELOPMENT SECTION FOR PRODUCT B | G02 | |
| G05 | SALES DIVISION | G01 | ZZZZ |
| G06 | T PROJECT DIVISION | NONE | TTTT |
| ⋮ | ⋮ | ⋮ | ⋮ |

COMMUNICATION MANAGEMENT APPARATUS, PROGRAM, COMMUNICATION MANAGEMENT METHOD, AND COMMUNICATION MANAGEMENT SYSTEM

BACKGROUND OF THE INVENTION

1. Field of the Invention

The present invention relates to a communication management apparatus, a program, a communication management method, and a communication management system.

2. Description of the Related Art

There have been conference systems including a host computer disposed in a conference room, in which the host computer manages a conference held in the conference room using a plurality of terminals connected to a network (see Patent Document 1, for example).

In such a conference system, the host computer calculates a unique password for a conference and displays the calculated password on a display unit. When the host computer receives a request to participate in the conference including a password from a terminal, the host computer compares the received password with the password displayed on the display unit. If the passwords match, the host computer permits the terminal that transmitted the request to participate in the conference such that the terminal is used at the conference.

[Patent Document 1] Japanese Laid-Open Patent Application No. 2003-333559

SUMMARY OF THE INVENTION

It is a general object of at least one embodiment of the present invention to provide a communication management apparatus capable of performing detailed access control with reduced operations, a program, a communication management method, and a communication management system.

In an embodiment, a communication management apparatus for performing access control over a plurality of terminal devices is provided. The communication management apparatus includes a registration unit that accepts registration of a group of terminal devices to be granted permission of access among the plurality of terminal devices; and an access control unit that performs access control, if authentication information is set in association with the group in group information having information about the group, to permit access from one terminal device of the group of the terminal devices that supplies an input that matches the authentication information.

According to an embodiment of the present invention, it is possible to perform detailed access control with reduced operations.

BRIEF DESCRIPTION OF THE DRAWINGS

Other objects and further features of embodiments will become apparent from the following detailed description when read in conjunction with the accompanying drawings, in which:

FIG. 4 is a configuration diagram showing an example of a group information table;

FIG. 5 is a configuration diagram showing an example of a conference information table;

FIG. 6 is a configuration diagram showing an example of a materials information table;

FIG. 7 is an illustration of an example of a conference registration screen;

FIG. 9 is an illustration of an example of a conference participation screen;

FIG. 12 is a configuration diagram showing another example of a group information table;

DESCRIPTION OF THE PREFERRED EMBODIMENTS

In the following, embodiments of the present invention will be described with reference to the accompanying drawings. In the present embodiment, a conference system will be described as an example of a communication management system that needs to perform access control over a plurality of terminal devices. The conference system according to the present embodiment specifies participants of a conference by a group and performs access control by a password based on a unit of the group, thereby performing the access control with reduced operations.

First Embodiment

<System Configuration>

Figure 1:
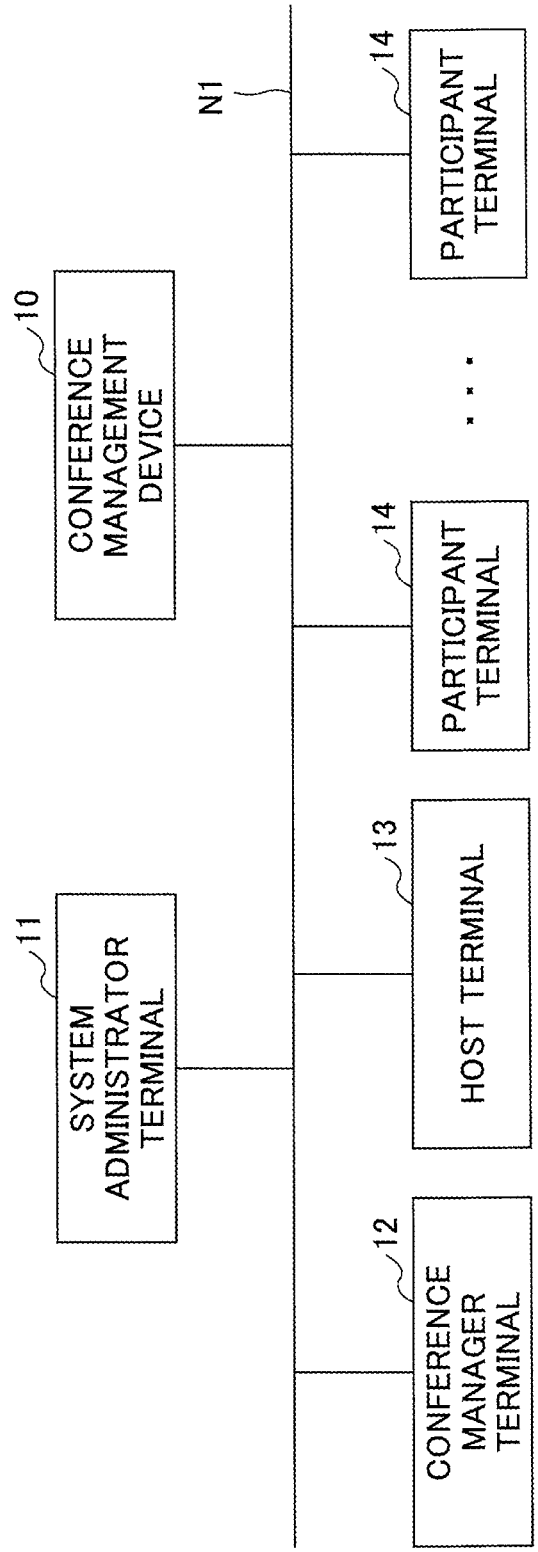
FIG. 1 is a configuration diagram showing an example of a conference system according to an embodiment of the present invention.

FIG. 1 is a configuration diagram showing an example of a conference system according to the present embodiment. A conference system 1 in FIG. 1 shows an example of a configuration in which a conference management device 10, a system administrator terminal 11, a conference manager terminal 12, a host terminal 13, and at least one participant terminal 14 are connected to a network N1 such as a LAN. The conference system 1 may employ any electronic conference system such as a video conference system or a Web conference system, for example.

The conference management device 10 manages conference information, group information, and materials information. The conference management device 10 also holds a conference and controls participation in the conference. The conference management device 10 can be implemented using software or a service operating on a computer. The conference management device 10 may also be software or a service operating on a plurality of computers. The conference management device 10 may be in a form of what is called a "cloud service". The conference management device 10 is implemented by an information processing device such as a device dedicated to the conference system 1, a general workstation, or a personal computer (PC).

The system administrator terminal 11 has a function of registering group information described later with the conference management device 10. A system administrator or a group manager (hereafter simply referred to as a "system administrator") can register group information and the like with the conference management device 10 from the system administrator terminal 11. The system administrator terminal 11 may be a virtual machine, a device dedicated to the conference system 1, or a terminal device such as a PC, a tablet terminal, a smartphone, a mobile phone, or a PDA.

The system administrator terminal 11 can be implemented using software or a service operating on a terminal device. Software or a service operating on the system administrator terminal 11 may be a native application operating solely or a Web browser and a Web application operating on the Web browser.

The conference manager terminal 12 has a function of registering conference information, materials information, and the like described later with the conference management device 10. A conference manager can register the conference information, the materials information, and the like with the conference management device 10 from the conference manager terminal 12. The conference manager terminal 12 may be a virtual machine, a device dedicated to the conference system 1, or a terminal device such as a PC, a tablet terminal, a smartphone, a mobile phone, or a PDA.

The conference manager terminal 12 can be implemented using software or a service operating on a terminal device. Software or a service operating on the conference manager terminal 12 may be a native application operating solely or a Web browser and a Web application operating on the Web browser.

The host terminal 13 has a function of holding a conference. A host can send a request to hold a conference from the host terminal 13 to the conference management device 10. The host terminal 13 may be a virtual machine, a device dedicated to the conference system 1, or a terminal device such as a PC, a tablet terminal, a smartphone, a mobile phone, or a PDA.

The host terminal 13 can be implemented using software or a service operating on a terminal device. Software or a service operating on the host terminal 13 may be a native application operating solely or a Web browser and a Web application operating on the Web browser.

The participant terminal 14 has functions of obtaining the conference information and conference materials from the conference management device 10 and participating in a conference. A conference participant can participate in the conference from the participant terminal 14. The participant terminal 14 may be a virtual machine, a terminal device such as a PC, a tablet terminal, a smartphone, a mobile phone, or a PDA, a display device such as an electronic whiteboard, a projection device such as a projector, or a device dedicated to the conference system 1. The participant terminal 14 may be an image forming device such as a printer or a multifunction peripheral. For example, while the participant terminal 14 is in conference, the participant terminal 14 can receive an input operation in real time from an other participant terminal 14 via the conference management device 10 and share a display with the other participant terminal 14.

In the conference system 1, the conference management device 10, the system administrator terminal 11, the conference manager terminal 12, the host terminal 13, and at least one participant terminal 14 can perform data communication via the network N1 such as a LAN. The network N1 may be a LAN, the Internet, or a dedicated line and may be a wired or wireless network.

<Hardware Configuration>

Figure 2:
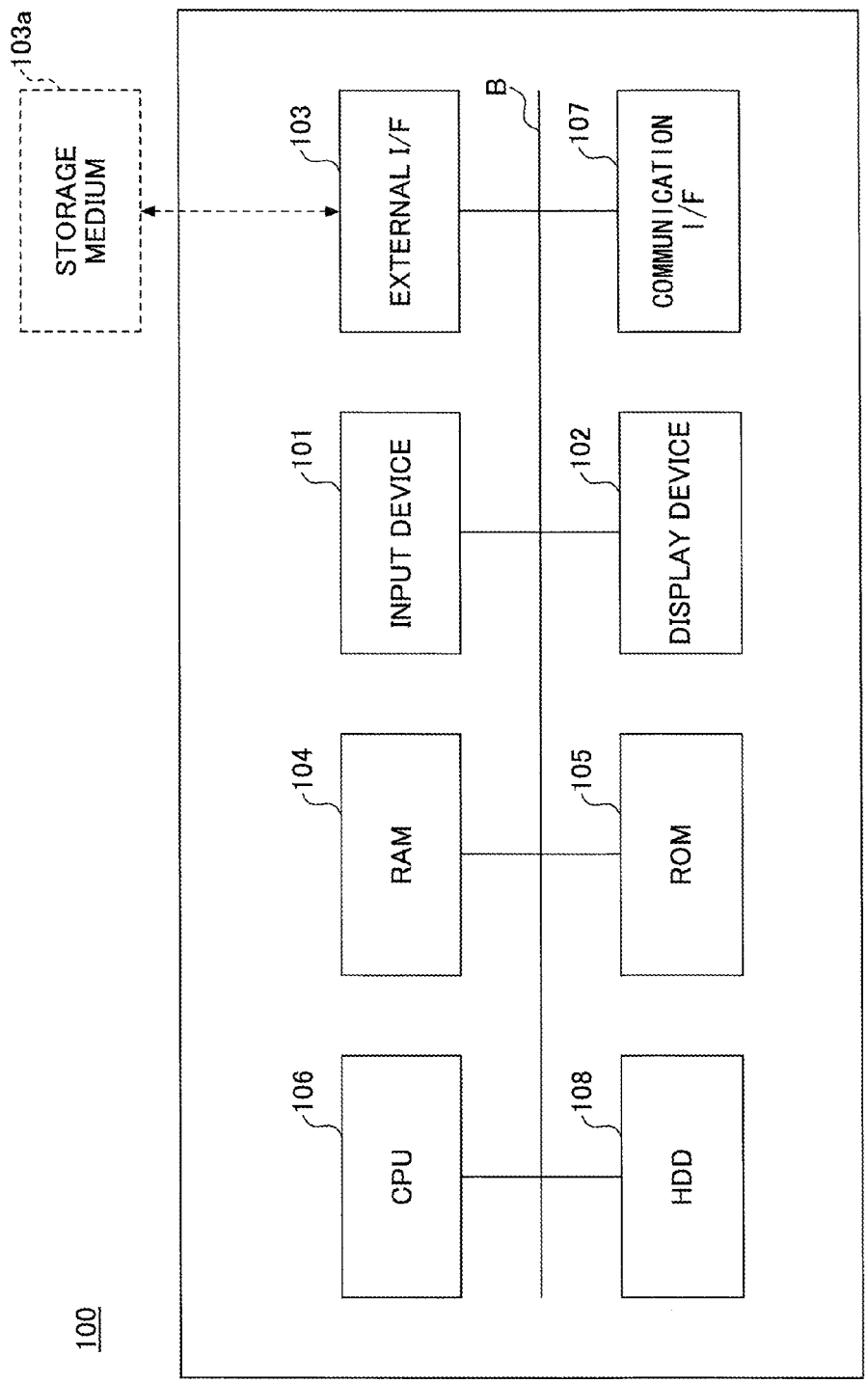
FIG. 2 is a hardware configuration diagram showing an example of a computer according to an embodiment of the present invention.

The conference management device 10, the system administrator terminal 11, the conference manager terminal 12, the host terminal 13, and the participant terminal 14 are implemented by a computer 100 having a hardware configuration as shown in FIG. 2, for example. FIG. 2 is a hardware configuration diagram showing an example of a computer according to the present embodiment.

The computer 100 shown in FIG. 2 includes an input device 101, a display device 102, an external I/F 103, a RAM 104, a ROM 105, a CPU 106, a communication I/F 107, an HDD 108, and the like connected mutually to one another via a bus B.

The input device 101 includes a keyboard and a mouse and is used to input signals of operation to the computer 100. The display device 102 includes a display screen and displays a result of a process performed by the computer 100.

The communication I/F 107 is an interface for connecting the computer 100 to the network N1. In accordance with this, the computer 100 can perform data communication with other computers 100 via the communication I/F 107.

The HDD 108 is a non-volatile storage device that stores a program and data. Examples of such a program and data to be stored include an OS which functions as basic software for controlling an entire portion of the computer 100 and include application software for providing various types of functions on the OS.

The external I/F 103 is an interface for an external device. The external device includes a storage medium 103a, for example. In accordance with this, the computer 100 can read and/or write on the storage medium 103a via the external I/F 103. Examples of the storage medium 103a include a flexible disc, a CD, a DVD, an SD memory card, a USB memory, and the like.

The ROM 105 is a non-volatile semiconductor memory (storage device) capable of storing a program and data even in a powered-off state. The ROM 105 stores a BIOS to be executed when the computer 100 starts up, an OS setting, a program for network setting, and data. The RAM 104 is a volatile semiconductor memory for temporarily storing a program and data.

The CPU 106 is an arithmetic unit that controls an entire portion of the computer 100 and implements functions thereof by reading out a program and data from a storage device such as the ROM 105 or the HDD 108 onto the RAM 104 and executing a process.

The conference management device 10, the system administrator terminal 11, the conference manager terminal 12, the host terminal 13, and the participant terminal 14 can implement various types of processes as described later by executing a program on the computer 100 having the above-mentioned hardware configuration, for example.

<Software Configuration>

The conference management device 10 of the conference system 1 according to the present embodiment is implemented by the following functional blocks.

<<Conference Management Device>>

Figure 3:
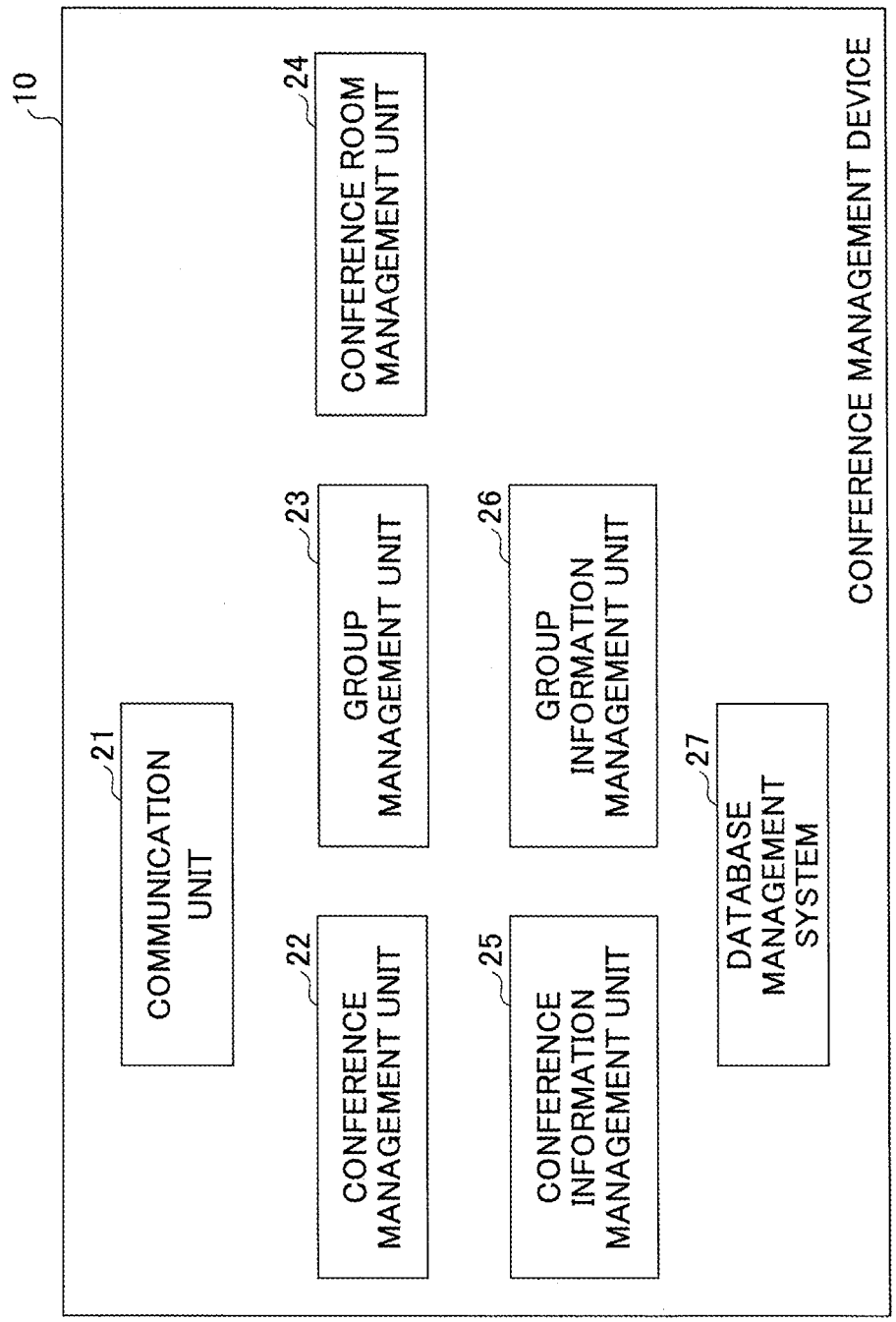
FIG. 3 is a functional block diagram showing an example of a conference management device.

The conference management device 10 is implemented by functional blocks as shown in FIG. 3, for example. FIG. 3 is a functional block diagram showing an example of a conference management device. While the functional blocks shown in FIG. 3 represent functions of managing conference information, managing group information, and managing a conference room among those functions provided by the conference management device 10, other function may also be present.

The conference management device 10 implements, by executing a program, a communication unit 21, a conference management unit 22, a group management unit 23, a conference room management unit 24, a conference information management unit 25, a group information management unit 26, and a database management system 27.

The communication unit 21 is for performing communication with the system administrator terminal 11, the conference manager terminal 12, the host terminal 13, and the participant terminal 14. In accordance with content transmitted from the system administrator terminal 11, the conference manager terminal 12, the host terminal 13, and the participant terminal 14, the communication unit 21 distributes the transmitted content to the conference management unit 22, the group management unit 23, or the conference room management unit 24. Further, the communication unit 21 receives a response to the transmitted content from the conference management unit 22, the group management unit 23, or the conference room management unit 24 and sends the response to the system administrator terminal 11, the conference manager terminal 12, the host terminal 13, and the participant terminal 14.

The conference management unit 22 receives the content transmitted from the system administrator terminal 11, the conference manager terminal 12, the host terminal 13, or the participant terminal 14. Based on the transmitted content received by the conference management unit 22, the conference management unit 22 performs a process to create a conference, change a conference, or delete a conference, for example, while editing the conference information and the group information.

The group management unit 23 receives the content transmitted from the system administrator terminal 11, the conference manager terminal 12, the host terminal 13, or the participant terminal 14. Based on the transmitted content received by the group management unit 23, the group management unit 23 performs a process to create a group, change a group, or delete a group, for example, while editing the group information.

The conference room management unit 24 receives the content transmitted from the system administrator terminal 11, the conference manager terminal 12, the host terminal 13, or the participant terminal 14. Based on the transmitted content received by the conference room management unit 24, the conference room management unit 24 performs a process to create a conference room or delete a conference room, for example, while editing the conference information and the group information. The conference room means a virtual conference to be held. The virtual conference is created when a request to hold a conference is received and the virtual conference is discarded when a request to end a conference is received. The conference information management unit 25 receives a request from the conference management unit 22 or the conference room management unit 24 and edits, via the database management system 27, the conference information stored in a database. The group information management unit 26 receives a request from the conference management unit 22, the group management unit 23, or the conference room management unit 24 and edits, via the database management system 27, the group information stored in the database.

The database management system 27 manages the conference information, the group information, and the like stored in the database and edits the conference information or the group information based on a request received from the conference management unit 22, the group management unit 23, or the conference room management unit 24.

The functional blocks shown in FIG. 3 are an example and a portion of the functional blocks included in the conference management device 10 in FIG. 3 may operate on another information processing device. In this case, the functional blocks perform communication with one another where necessary to exchange information.

<<Group Information Table>>

The database stores a group information table as shown in FIG. 4, for example. FIG. 4 is a configuration diagram showing an example of the group information table. The group information table in FIG. 4 manages group information as information about groups. The group represents a unit constituting an organization or a project.

The group information table in FIG. 4 has a group ID, a name, a password, and the like as items. The group ID indicates identification information for uniquely identifying a group. The name indicates a name of a group constituting an organization or a project. The password indicates authentication information set for the group. The group information table associates the password with the group ID for which the password is set and manages the password and the group ID.

<<Conference Information Table>>

The database stores a conference information table as shown in FIG. 5, for example. FIG. 5 is a configuration diagram showing an example of the conference information table. The conference information table in FIG. 5 manages conference information as information about conferences.

The conference information table in FIG. 5 has a conference ID, a name, a start date and time, a conference status, a password to hold, a password to participate, a participant group ID, a document ID, and the like as items. The conference ID is an example of identification information for uniquely identifying a conference. The name indicates a name of a conference. The conference status indicates a status of a conference such as before, open, or after.

The password to hold is an example of authentication information necessary to hold a conference. The password to participate is an example of authentication information necessary to participate in a conference. The participant group ID indicates a group ID of a group of participants capable of participating in a conference. The document ID is an example of identification information about conference materials to be used at a conference. In FIG. 5, "None" set for the password to hold, the password to participate, or the participant group ID in the conference information table shows an example where the password to hold, the password to participate, or the participant group ID is not set.

<<Materials Information Table>>

The database stores a materials information table as shown in FIG. 6, for example. FIG. 6 is a configuration diagram showing an example of the materials information table. The materials information table in FIG. 6 manages materials information as information about conference materials. The materials information table in FIG. 6 has a document ID, a name, a storage location, and the like as items.

The document ID is an example of identification information for uniquely identifying conference materials. The name indicates a name of a conference document. The storage location is an example of information about a location for substantially storing conference materials (conference materials data). While the materials information table in FIG. 6 is an example of information about a location for storing conference materials data, the materials information table may store the conference materials data.

<Details of Processes>

In the following, processes by the conference system 1 according to the present embodiment are described in detail.

<<Conference Registration Process>>

A conference manager needs to register conference information and materials information with the conference management device 10 before holding a conference. The conference manager operates the conference manager terminal 12 to request access to a conference registration screen of the conference management device 10. The conference manager terminal 12 accesses a URL of the conference registration screen of the conference management device 10, for example.

The conference manager terminal 12 displays a conference registration screen of FIG. 7, for example, on the display device 102 based on conference registration screen data transmitted from the conference management device 10. FIG. 7 is an illustration of an example of the conference registration screen. The conference registration screen is for allowing the conference manager to register information about a conference.

The conference registration screen in FIG. 7 shows an example where the conference registration screen has a field for inputting a conference name, a start date and time, a password to hold, a password to participate, and a participant group and a field for adding conference materials data such as a file as conference materials.

From the field for inputting a participant group, it is possible to input at least one group of participants to be permitted to participate in a conference. From the field for adding conference materials data such as a file as conference materials, it is possible to register at least one of conference materials corresponding to conference information.

In addition, if the conference system 1 merely shares a display among participant terminals 14, conference materials may not be registered. By not inputting the password to hold, the password to participate, and the participant group into the conference registration screen in FIG. 7, the conference manager is able to omit access control that involves the password to hold, the password to participate, and the participant group.

The conference manager operates the conference manager terminal 12 to input information about a conference into the conference registration screen and then presses a Save button at a bottom of the conference registration screen. When the Save button is pressed, the conference manager terminal 12 sends, to the conference management device 10, a request to register information about the conference that has been input into the conference registration screen.

The communication unit 21 of the conference management device 10 distributes the request to register information about the conference from the conference manager terminal 12 to the conference management unit 22. Based on the request to register information about the conference received from the communication unit 21, the conference management unit 22 requests the conference information management unit 25 to add conference information and materials information to the conference information table shown in FIG. 5 and to the materials information table shown in FIG. 6. The conference information management unit 25 creates a conference by adding the conference information and the materials information to the conference information table shown in FIG. 5 and to the materials information table shown in FIG. 6 via the database management system 27.

As mentioned above, from the conference manager terminal 12, the conference manager can create a conference that performs access control based on a group unit.

<<Conference Participation Process>>

Figure 8:
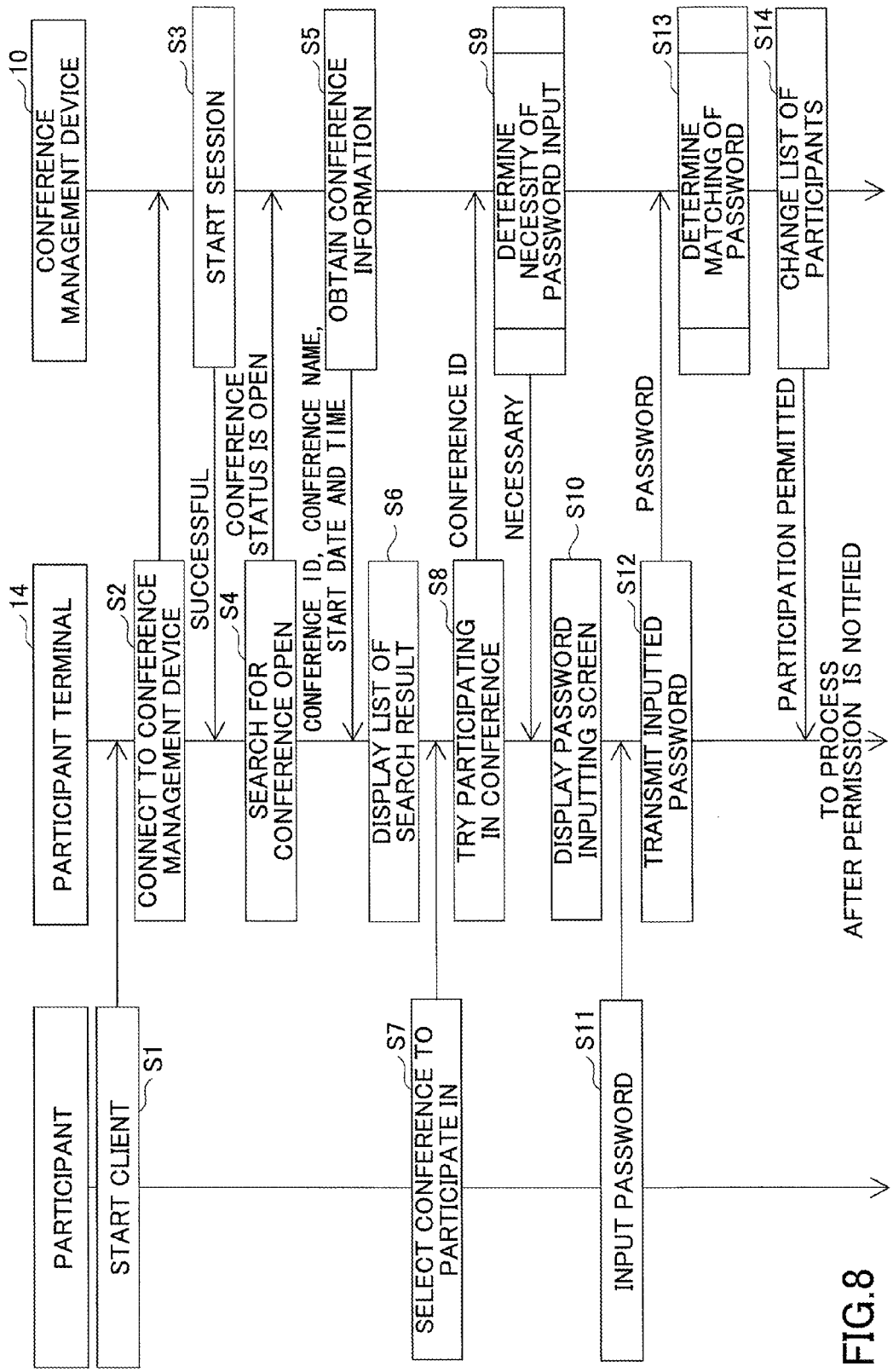
FIG. 8 is a sequence diagram showing an example of a conference participation process.

FIG. 8 is a sequence diagram showing an example of a conference participation process. In step S1, a conference participant starts the participant terminal 14 and requests access to a conference participation screen. In step S2, the participant terminal 14 accesses a URL of the conference participation screen of the conference management device 10, for example.

In step S3, the communication unit 21 of the conference management device 10 establishes a session with the participant terminal 14 based on the access from the participant terminal 14. When the establishment of the session is successful, the communication unit 21 of the conference management device 10 notifies the successful establishment of the session to the participant terminal 14 and further transmits conference participation screen data to the participant terminal 14.

In step S4, the participant terminal 14 displays a conference participation screen on the display device 102 based on the conference participation screen data transmitted from the conference management device 10. FIG. 9 is an illustration of an example of the conference participation screen. The conference participation screen in FIG. 9 includes a field for searching for a conference based on a search condition and a field for displaying a list of conferences as a search result.

The conference participation screen in FIG. 9 is an example where a list of conferences with conference IDs "M01" to "M04" is displayed. In step S4, the participant orders a search for a conference using a conference status "open" as a search condition. The participant terminal 14 sends a request to search for a conference to the conference management device 10 using the conference status "open" as the search condition.

In step S5, the communication unit 21 of the conference management device 10 distributes the request to search for a conference from the participant terminal 14 to the conference management unit 22. Based on the request to search for a conference received from the communication unit 21, the conference management unit 22 requests the conference information management unit 25 to obtain conference information having a conference status "open" from the conference information table in FIG. 5. The conference information management unit 25 obtains conference information having a conference status "open" from the conference information table in FIG. 5 via the database management system 27 and provides the obtained conference information to the conference management unit 22. The conference management unit 22 transmits, via the communication unit 21, the conference information having the conference status "open" to the participant terminal 14 which sent the request to search for the conference.

In step S6, based on a search result transmitted from the conference management device 10, the participant terminal 14 displays the conference information having the conference status "open" in the field for displaying a list of conferences as a search result on the conference participation screen.

In step S7, the conference participant selects a conference to participate in among those conferences displayed in a list on the conference participation screen in FIG. 9, for example, and presses a "Participate" button at a bottom of the conference participation screen. The process of the participant terminal 14 progresses to step S8 and sends a request to participate in the conference selected by the conference participant to the conference management device 10.

In step S9, the communication unit 21 of the conference management device 10 distributes the request to participate in the conference from the participant terminal 14 to the conference room management unit 24. Based on conference information about the conference which the participant terminal 14 sent the request to participate in, the conference room management unit 24 determines necessity of password input. While the determination of the necessity of password input will be described in detail later, the following describes a case where the password input is determined to be necessary. In addition, if the password input is determined to be unnecessary, steps S10-S13 are omitted and the process progresses to step S14.

If the password input is determined to be necessary, the conference room management unit 24 notifies, via the communication unit 21, that the password input is necessary to the participant terminal 14 which sent the request to participate in the conference. In step S10, the participant terminal 14 displays a password input screen. In step S11, the conference participant inputs a password on the password input screen. In step S12, the participant terminal 14 transmits the password input on the password input screen to the conference management device 10.

In step S13, the communication unit 21 of the conference management device 10 distributes the password transmitted from the participant terminal 14 to the conference room management unit 24. The conference room management unit 24 determines matching of passwords using the password transmitted from the participant terminal 14. While the determination of the matching of passwords will be described in detail later, the following describes a case where participation in the conference is permitted as a result of the determination of the matching of passwords. In addition, if the participation in the conference is not permitted, disapproval of participation is notified to the participant terminal 14 which sent the request to participate in the conference.

If the participation in the conference is permitted, in step S14, the conference room management unit 24 changes a list of participants of the conference which the participant terminal 14 sent the request to participate in by adding information about the participant terminal 14 to the list of conference participants. The list of conference participants is for managing the participant terminals 14 of participants that participate in the conference by each conference room.

The process progresses to step S15 and the conference room management unit 24 notifies, via the communication unit 21, permission of participation to the participant terminal 14 which sent the request to participate in the conference. A process of the participant terminal 14 after the permission is notified is different depending on the conference system 1.

If the conference system 1 shares a display, for example, the shared display is on a display screen of each participant terminal 14. If the conference system 1 shares conference materials registered with the conference management device 10, for example, the shared conference materials are displayed on each participant terminal 14. The conference system 1 sharing the conference materials can associate a display of the conference materials with page flipping or the like by distributing an input operation of a presenter, for example, from the conference management device 10 to the participant terminal 14 of conference participants.

The conference management device 10 and the participant terminal 14 participating in a conference use an established communication channel to exchange information necessary to share a display or conference materials. Typical examples of such a communication channel include a protocol called XMPP.

XMPP has been standardized as RFC3920 (Extensible Messaging and Presence Protocol: Core), RFC3921 (Extensible Messaging and Presence Protocol: Instant Messaging and Presence) in IETF. Further, extended specifications of XMPP have been documented as XEP.

XMPP can provide a service called a group chat (Multi-User Chat [XEP-0045]). The group chat includes a function by which when the participant terminal 14 participating in a conference room (room) provided by XMPP transmits a message to the conference management device 10, the message is distributed from the conference management device 10 to any other participant terminals 14 participating in the conference room. For such a communication channel, in addition to XMPP, other protocols such as BOSH which is an extension of XMPP, WebSocket, and Comet can be used.

BOSH (Bidirectional-streams Over Synchronous HTTP) [XEP-0206] is a technique for transmitting and receiving a message over HTTP in XMPP. These protocols are for implementing a Push function of the conference management device 10. The Push function is for asynchronously transmitting information from the conference management device 10 to the participant terminal 14 rather than transmitting information upon receiving a request from the participant terminal 14 and the participant terminal 14 receives the information. In general HTTP communication, it is also possible to realize a similar function by regularly fetching information from the participant terminal 14.

Figure 10:
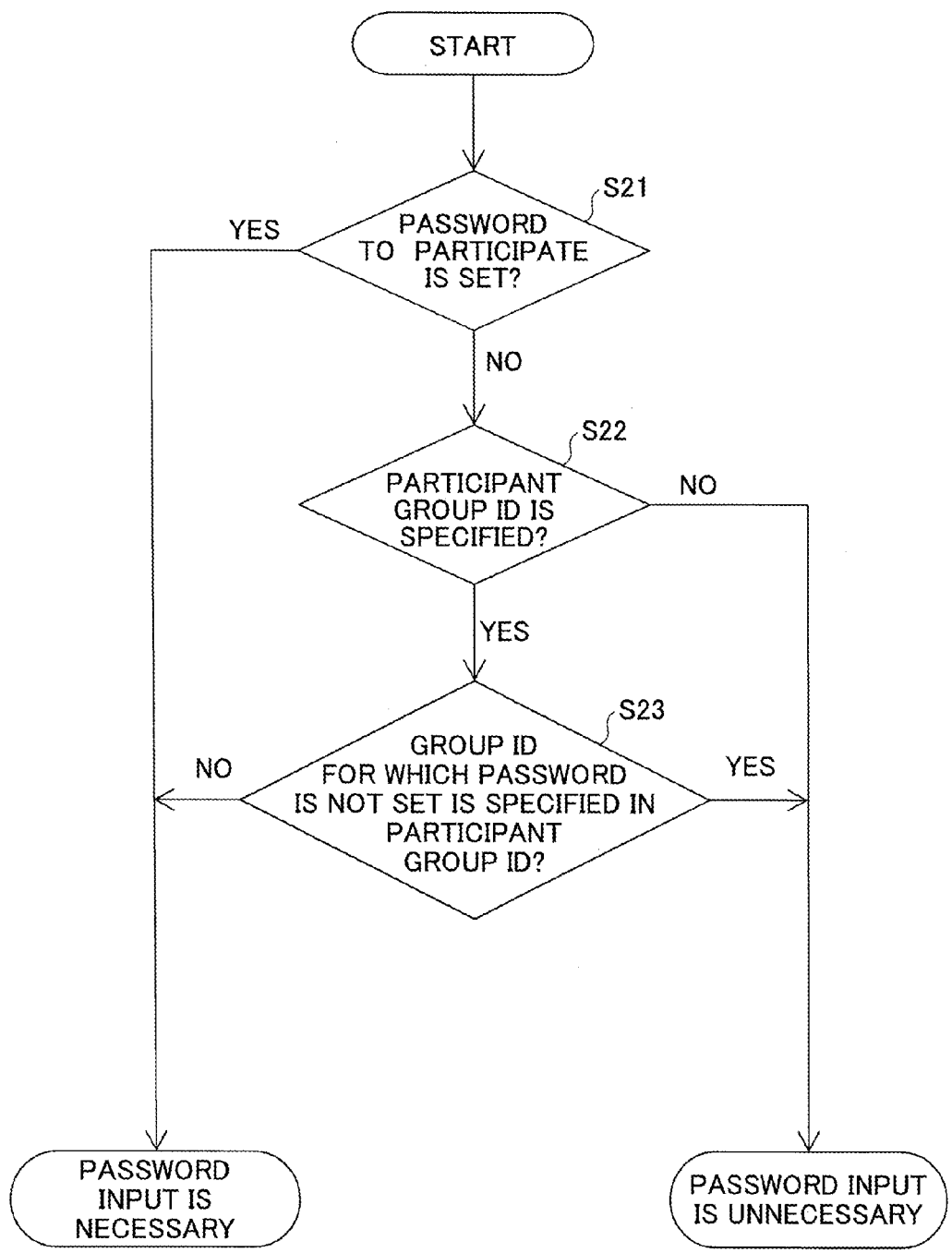
FIG. 10 is a flowchart showing an example of a process to determine necessity of password input.

Next, a process to determine necessity of password input in step S9 is described with reference to FIG. 10. FIG. 10 is a flowchart showing an example of the process to determine the necessity of password input.

In step S21, the conference room management unit 24 determines whether a password to participate is set in conference information about a conference which the participant sent a request to participate in. If the password to participate is set in the conference information about the conference which the participant sent the request to participate in (YES in S21), the conference room management unit 24 determines that password input is necessary.

If the password to participate is not set in the conference information about the conference which the participant sent the request to participate in (NO in S21), the conference room management unit 24 determines in step S22 whether a participant group ID is specified in the conference information about the conference which the participant sent the request to participate in. If the participant group ID is not specified in the conference information about the conference which the participant sent the request to participate in (NO in S22), the conference room management unit 24 determines that password input is unnecessary since neither the password to participate nor the participant group ID is specified in the conference information about the conference which the participant sent the request to participate in.

If the participant group ID is specified in the conference information about the conference which the participant sent the request to participate in (YES in S22), the conference room management unit 24 performs a process of step S23. In step S23, the conference room management unit 24 refers to the group information table shown in FIG. 4 to determine whether a group ID for which a password is not set in FIG. 4 is specified in the participant group ID in the conference information.

If the group ID for which a password is not set in FIG. 4 is not specified in the participant group ID in the conference information (NO in S23), the conference room management unit 24 determines that password input is necessary. In other words, the conference room management unit 24 determines that password input for a group to which the participant belongs is necessary.

If the group ID for which a password is not set is specified in the participant group ID in the conference information (YES in S23), the conference room management unit 24 determines that there is no need to input a password for a conference and so password input is unnecessary. In other words, for a request to participate in a conference for which a group ID without a password is specified in the participant group ID, it is determined that password input is unnecessary for any participants.

Figure 11:
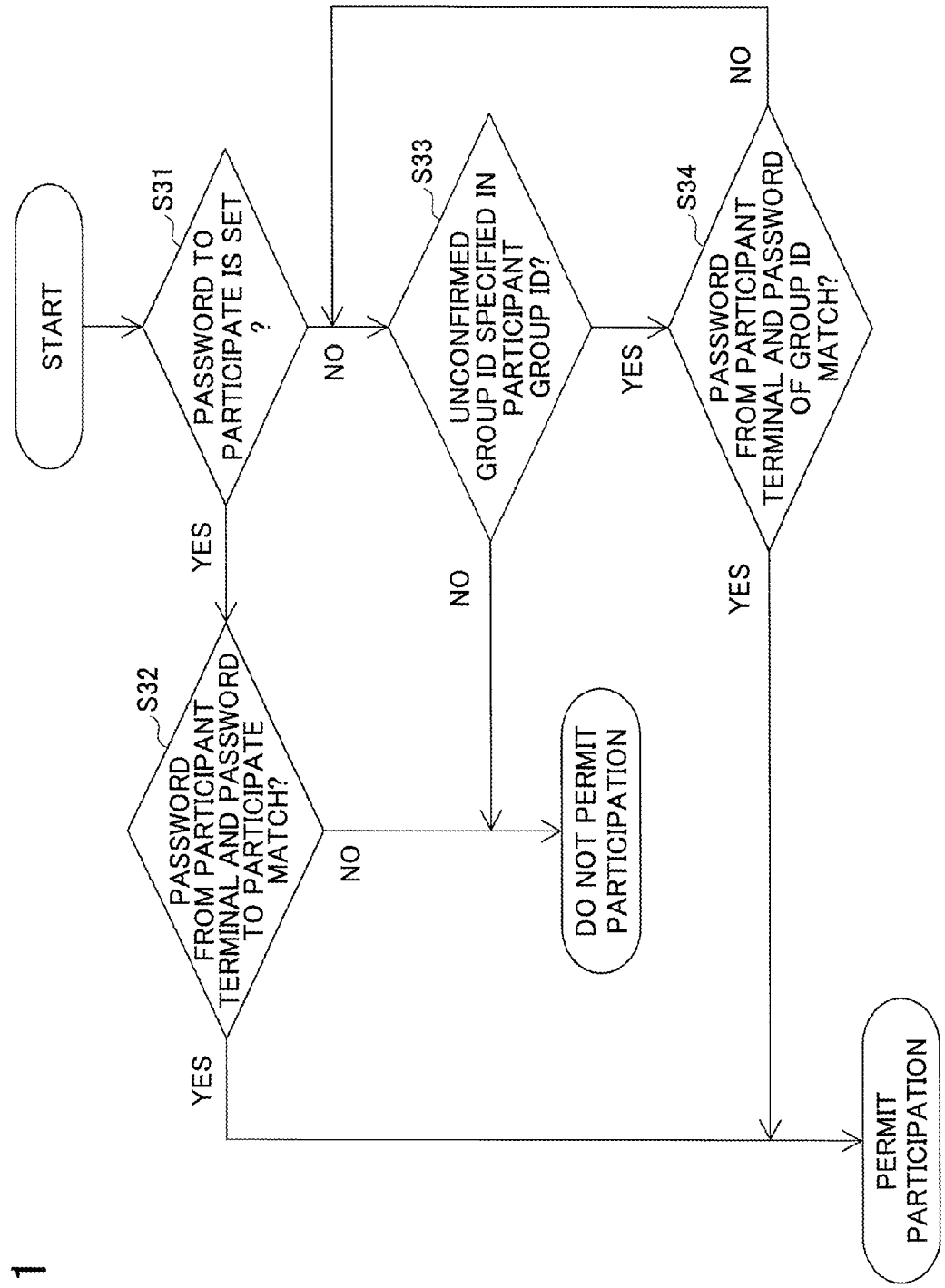
FIG. 11 is a flowchart showing an example of a process to determine matching of passwords.

Next, a process to determine matching of passwords in step S13 is described with reference to FIG. 11. FIG. 11 is a flowchart showing an example of the process to determine the matching of passwords.

In step S31, the conference room management unit 24 determines whether a password to participate is set in conference information about a conference which the participant sent a request to participate in. If the password to participate is set in the conference information about the conference which the participant sent the request to participate in (YES in S31), the conference room management unit 24 determines whether a password from the participant terminal 14 and the password to participate match in step S32.

If the password from the participant terminal 14 and the password to participate match (YES in S32), the conference room management unit 24 permits participation in the conference. By contrast, if the password from the participant terminal 14 and the password to participate do not match (NO in S32), the conference room management unit 24 does not permit participation in the conference. In this manner, when participating in a conference for which a password to participate is set in conference information, the participant must input a password corresponding to the password to participate on the password input screen so that the participant is permitted to participate in the conference.

In step S31, if the password to participate is not set in the conference information about the conference which the participant sent the request to participate in (NO in S31), the process of the conference room management unit 24 progresses to step S33. In step S33, the conference room management unit 24 determines whether there is an unconfirmed group ID among group IDs specified in the participant group ID in the conference information about the conference which the participant sent the request to participate in.

If there is an unconfirmed group ID (YES in S33), the conference room management unit 24 performs a process as to one of the unconfirmed group IDs in step 34. In step S34, the conference room management unit 24 refers to the group information table to determine whether the password from the participant terminal 14 and a password of the group ID match.

If the password from the participant terminal 14 and the password of the group ID match (YES in S34), the conference room management unit 24 permits participation in the conference. By contrast, if the password from the participant terminal 14 and the password of the group ID do not match (NO in S34), the process of the conference room management unit 24 returns to step S33.

In step S33, if the conference room management unit 24 determines that there is no unconfirmed group ID (NO in S33), the conference room management unit 24 determines that the password from the participant terminal 14 does not correspond to the password to participate or to the password of the group ID specified in participant group ID. Accordingly, the conference room management unit 24 does not permit participation in the conference.

<Conclusion>

According to the conference system 1 of the present embodiment, it is possible to specify a group of participants to be permitted to participate in a conference for each conference and to set a password for each group. Accordingly, it is possible to reduce operations for management compared with access control based on accounts. Further, according to the conference system 1 of the present embodiment, it is possible to perform detailed access control compared with access control based on a password for each conference.

For example, operations by a system administrator are reduced compared with accounts because a number of groups such as organizations or projects is smaller with lower frequency of change.

Since a conference manager can specify participants to be permitted to participate in a conference by groups, operations of the conference manager are reduced compared with specification of participants. For example, the conference manager can specify participants to be permitted to participate in a conference by groups having a number smaller than a number of accounts. It is easier for the conference manager to comprehend groups of participants to be permitted to participate in a conference than to correctly comprehend each of the participants. Even if participants to be permitted to participate in the conference increase immediately before the conference, the increased participants often belong to a specified group, so that additional operations will not be greatly required for the conference manager. Further, the conference manager does not need to think of a password for each conference or inform participants of the password. Participants have only to remember only one password of a group they belong to, so that operations are reduced.

In this manner, according to the conference system 1 of the present embodiment, it is possible to reduce operations of a system administrator, a conference manager, participants, and the like and to perform detailed access control compared with access control based on a password for each conference.

Second Embodiment

The conference system 1 according to a second embodiment uses, as a participant group ID, a group ID of a group having a hierarchical relationship with other group. Since the second embodiment is the same as the first embodiment except some portions, a description of the second embodiment is omitted where necessary. A system configuration and a hardware configuration are the same as in the first embodiment, so that a description of such portions is omitted.

<Software Configuration>

A software configuration in the second embodiment is different from the software configuration in the first embodiment in terms of a group information table. In the following, the group information table in the second embodiment is described.

FIG. 12 is a configuration diagram showing another example of the group information table. The group information table in FIG. 12 manages group information as information about groups. The groups in FIG. 12 indicate a unit constituting an organization or a project and having a hierarchical relationship among other groups.

Figure 13:
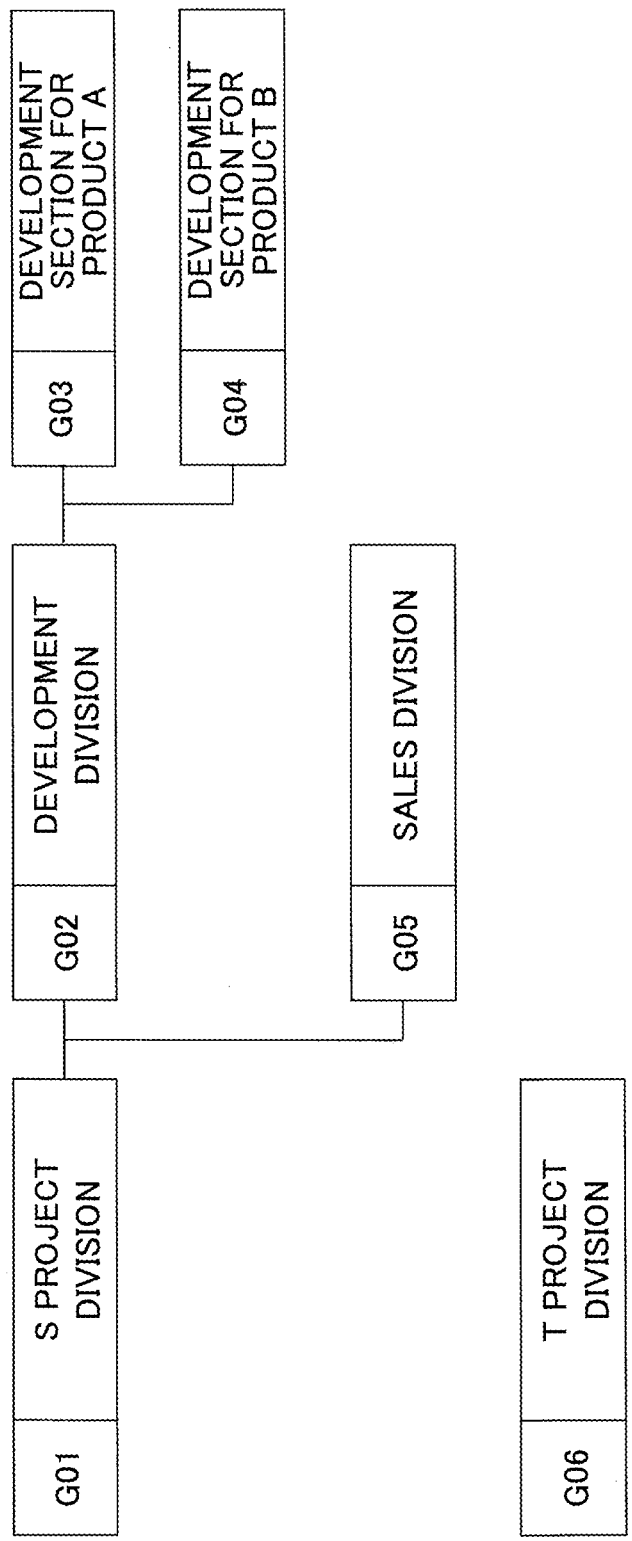
FIG. 13 is a schematic diagram showing a hierarchical relationship among groups.

The group information table in FIG. 12 has a parent group ID added to the items of the group information table shown in FIG. 4. The parent group ID is defined by a hierarchical relationship among groups and indicates a next higher group of each group. In the parent group ID, "None" indicates that a group is at a top of the hierarchy. For example, the group information table in FIG. 12 indicates a hierarchical relationship among groups as shown in FIG. 13. FIG. 13 is a schematic diagram showing the hierarchical relationship among the groups.

<Details of Processes>

In the following, processes by the conference system 1 according to the second embodiment are described based on a difference from the conference system 1 according to the first embodiment.

<<Conference Registration Process>>

Figure 14:
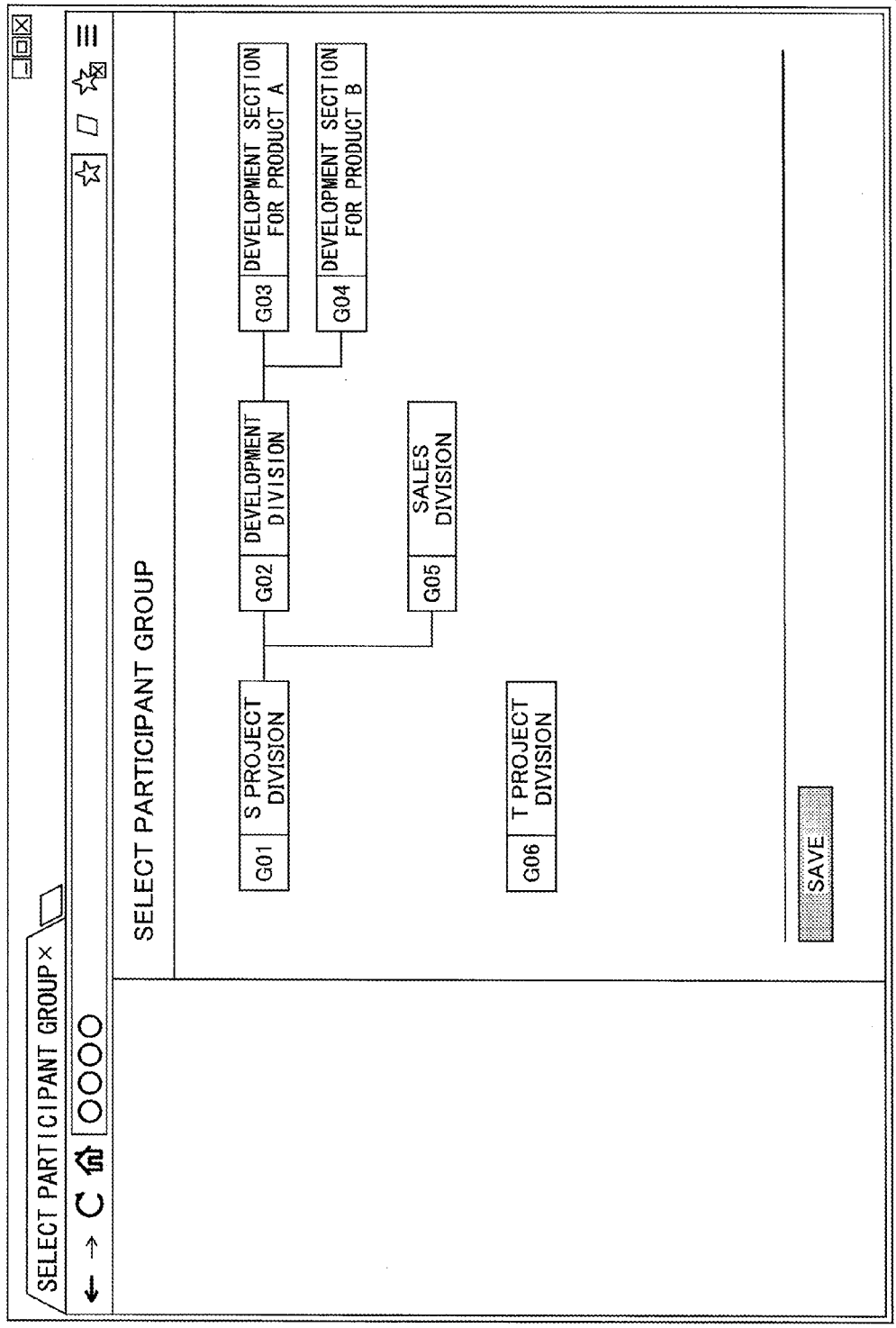
FIG. 14 is an illustration of an example of a participant group input screen.

It is considered that in the conference system 1 according to the second embodiment, when a participant group is input on the conference registration screen shown in FIG. 7 in a conference registration process, the participant group is input on a screen as shown in FIG. 14, for example.

FIG. 14 is an illustration of an example of a participant group input screen. The participant group input screen in FIG. 14 shows an example where a hierarchical relationship among groups is visualized based on group information in FIG. 12. For example, a conference manager operates the conference manager terminal 12 to input at least one group of participants to be permitted to participate in a conference from the participant group input screen.

In addition, in the participant group input screen, groups for which a password is set may be visually differentiated by colors, for example, and displayed distinguishably. Further, in the participant group input screen, if a group for which a password is set is input as a group of participants to be permitted to participate in a conference, this may be notified to the conference manager using a pop-up.

<<Conference Participation Process>>

Figure 15:
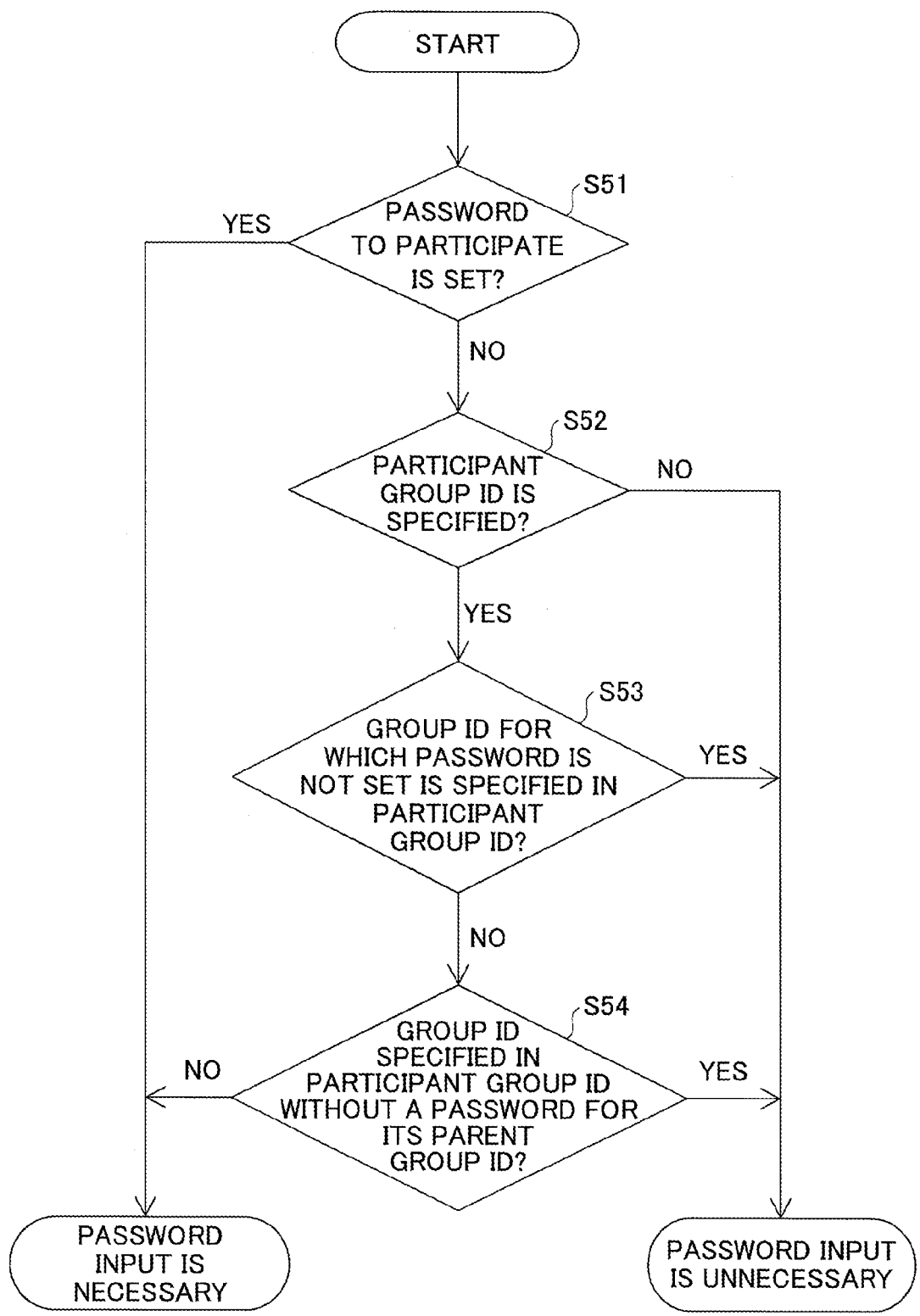
FIG. 15 is a flowchart showing another example of a process to determine necessity of password input.

In the conference system 1 according to the second embodiment, processes of step S9 and step S13 in FIG. 8 are different from corresponding processes in the conference system 1 according to the first embodiment. A process to determine necessity of password input in step S9 is described with reference to FIG. 15. FIG. 15 is a flowchart showing another example of the process to determine the necessity of password input.

Processes in steps S51-S52 are the same as processes in steps S21-S22 shown in FIG. 10, so that a description thereof is omitted. In step S53, the conference room management unit 24 refers to the group information table shown in FIG. 12 to determine whether a group ID for which a password is not set in FIG. 12 is specified in the participant group ID in the conference information.

If the group ID for which a password is not set in FIG. 12 is not specified in the participant group ID in the conference information (NO in S53), the process of the conference room management unit 24 progresses to step S54. In step S54, the conference room management unit 24 determines whether there is a group ID specified in the participant group ID without a password for its parent group ID in FIG. 12.

If there is no group ID specified in the participant group ID without a password for its parent group ID (NO in S54), the conference room management unit 24 determines that password input is necessary. In other words, the conference room management unit 24 determines that password input for a group to which a participant belongs is necessary.

In step S53, if the group ID for which a password is not set is specified in the participant group ID in the conference information (YES in S53), the conference room management unit 24 determines that there is no need to input a password for a conference and so password input is unnecessary. In other words, for a request to participate in a conference for which a group ID without a password is specified in the participant group ID, it is determined that password input is unnecessary for any participants.

In step S54, if there is a group ID specified in the participant group ID without a password for its parent group ID (YES in S54), the conference room management unit 24 determines that password input is unnecessary. This is because no password is set for a group ID higher than its own group ID, so that password input is determined to be unnecessary for any participants.

Figure 16:
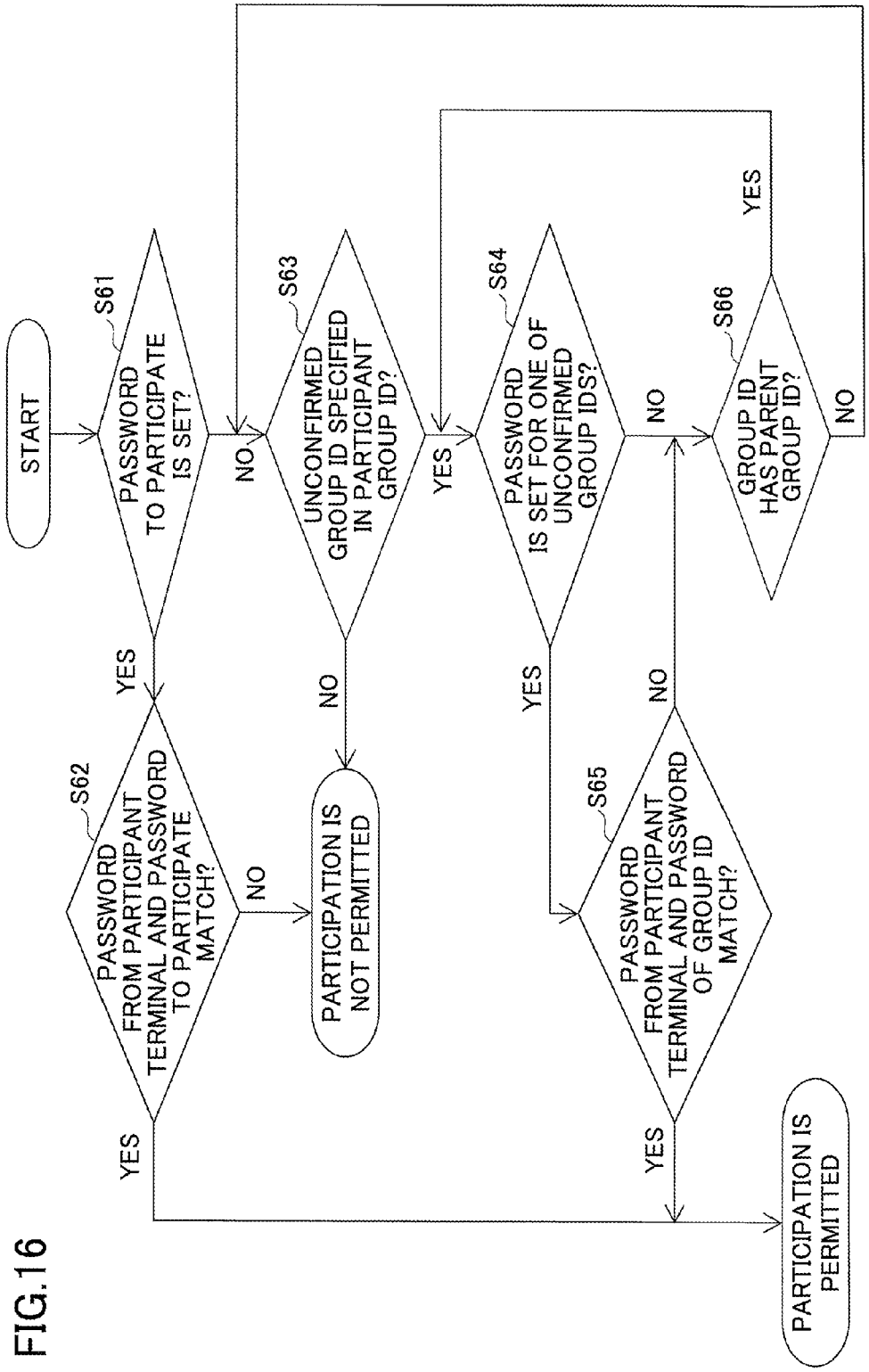
FIG. 16 is a flowchart showing another example of a process to determine matching of passwords.

A process to determine matching of passwords in step S13 is described with reference to FIG. 16. FIG. 16 is a flowchart showing another example of the process to determine the matching of passwords.

Processes in steps S61-S63 are the same as processes in steps S31-S33 shown in FIG. 11, so that a description thereof is omitted. In step S63, if there is an unconfirmed group ID among group IDs specified in the participant group ID in the conference information about a conference which a participant sent a request to participate in (YES in S63), the process of the conference room management unit 24 progresses to step S64.

In step S64, the conference room management unit 24 determines whether a password is set for one of the unconfirmed group IDs. If a password is set (YES in S64), the process of the conference room management unit 24 progresses to step S65 to refer to the group information table and the conference room management unit 24 determines whether a password from the participant terminal 14 and the password of the group ID match.

If the password from the participant terminal 14 and the password of the group ID match (YES in S65), the conference room management unit 24 permits participation in the conference.

By contrast, if the password from the participant terminal 14 and the password of the group ID do not match (NO in S65), the process of the conference room management unit 24 progresses to step S66. The process of the conference room management unit 24 also progresses to step S66 if a password is not set in step S64 (NO in S64). In step S66, the conference room management unit 24 refers to the group information table to determine whether a group has a parent group ID.

If the group has a parent group ID (YES in S66), the process of the conference room management unit 24 returns to step S64 and performs a process as to the parent group ID in the same manner as to the group ID mentioned above. If the group does not have a parent group ID (NO in S66), the process of the conference room management unit 24 returns to step S63.

In step S63, if it is determined that there is no unconfirmed group ID (NO in S63), the conference room management unit 24 determines that the password from the participant terminal 14 does not correspond to the password to participate or to the password of the group ID specified in the participant group ID. Further, the conference room management unit 24 determines that the password from the participant terminal 14 does not correspond to the password of the parent group ID of the group ID specified in the participant group ID. Accordingly, the conference room management unit 24 does not permit participation in the conference.

<Conclusion>

According to the conference system 1 in the second embodiment, even if a group ID of a group having a hierarchical relationship with other group is used as a participant group ID, it is possible to obtain the same effect as in the conference system 1 in the first embodiment.

The present invention is not limited to the above-mentioned embodiments that are specifically disclosed, but various types of variations and modifications may be made without departing from the scope of the claims of the present invention. For example, while the conference system 1 is described as an example of a communication management system in the embodiments, it is possible to apply the conference system 1 to a system for performing access control such as a seminar system or an education system.

For example, the conference management device 10 is an example of a communication management apparatus. The participant terminal 14 is an example of a terminal device. The conference management unit 22 is an example of a registration unit. The conference room management unit 24 is an example of an access control unit.

In addition, the conference system 1 including the conference management device 10, the system administrator terminal 11, the conference manager terminal 12, the host terminal 13, and at least one participant terminal 14 is described as an example. There are various types of system configurations depending on uses and purposes thereof as a matter of course.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Further, the present invention is not limited to these embodiments, and various variations and modifications may be made without departing from the scope of the present invention.

The present application is based on and claims the benefit of priority of Japanese Priority Patent Application No. 2013-244634 filed on Nov. 27, 2013, the entire contents of which are hereby incorporated by reference.

What is claimed is:

1. A communication management apparatus for performing access control over a plurality of terminal devices, comprising:
   a memory having computer readable instructions stored thereon; and
   at least one processor configured to execute the computer readable instructions to, store in the memory a plurality of group identification information, each of the plurality of group identification information being associated with a group, the group representing an organization or project, each of the plurality of group identification information including identification of at least one terminal device that is a member of the group, where at least one or more of the plurality of group identification information is stored in association with authentication information, and at least one or more of the plurality of group identification information is stored without being associated with authentication information, register, based on a registration request received from the at least one terminal device, the plurality of group identification information with the memory in association with conference identification information for identifying a conference, the plurality of group identification information being stored in the memory;
   receive a request to participate in the conference from the at least one terminal device, the request including conference identification information corresponding to the requested conference;
   specify at least two group identification information from the plurality of group identification information to be associated with the received conference identification information;
   determine whether each of the at least two specified group identification information is associated with authentication information in the memory;
   determine that an input of authentication information is necessary if each of the at least two specified group identification information is determined to be associated with authentication information;
   determine that the input of the authentication information is unnecessary if at least one of the at least two specified group identification information is determined to be unassociated with authentication information;
   in response to the determination that the input of the authentication information is necessary based on a result of the input of the authentication information determination, request the terminal device to input authentication information, the terminal device having sent the request to participate in the conference; and
   in response to the determination that the input of the authentication information is unnecessary, the at least one processor is configured to permit access from all of the plurality of terminal devices associated with the at least two specified group identification information.

2. The communication management apparatuses as claimed in claim 1, wherein when registration of at least one of the plurality of group identification information to be granted access permission is accepted, if the plurality of group identification information includes at least one group identification information for which the authentication information is not set, the at least one processor is configured to perform access control to permit access to all of the plurality of terminal devices.

3. The communication management apparatus as claimed in claim 1, wherein the at least one processor is further configured to: accept registration of a first hierarchical group of terminal devices from the plurality of terminal devices having a hierarchical relationship with a second hierarchical group of terminal devices from the plurality of terminal devices, the first hierarchical group of terminal devices being granted access permission; and wherein if the authentication information is set in association with the first hierarchical group of terminal devices and the second hierarchical group of terminal devices is higher than the first hierarchical group in the group identification information, the at least one processor is configured to determine that input of the authentication information by at least one terminal device of the first hierarchical group of terminal devices is necessary and sends a request for the input of the authentication information to the at least one terminal device of the first hierarchical group of terminal devices.

4. The communication management apparatus as claimed in claim 3, wherein if the authentication information is not set in association with the first hierarchical group of terminal devices and the second hierarchical group of terminal devices higher than the first hierarchical group in the group identification information, the at least one processor is configured to perform access control to permit access from all of the plurality of terminal devices.

5. The communication management apparatus as claimed in claim 4, wherein when registration of a plurality of hierarchical groups of terminal devices to be granted access permission is accepted, if the plurality of hierarchical groups of terminal devices include at least one hierarchical group of terminal devices for which the authentication information is not set in the group identification information, the at least one processor is configured to perform access control to permit access to all of the plurality of terminal devices.

6. The communication management apparatus as claimed in claim 3, wherein when the at least one processor is configured to accept registration of the first hierarchical group of terminal devices having a hierarchical relationship with the second hierarchical group of terminal devices, the first hierarchical group of terminal devices being granted access permission, the hierarchical groups of terminal devices associated with authentication information and the hierarchical groups of terminal devices not associated with the authentication information are displayed distinguishably based on the group identification information.

7. The communication management apparatus as claimed in claim 1, wherein the communication management apparatus is configured to perform access control over at least one group of terminal devices in accordance with the authentication information in order to control participation in a virtual conference.

8. A communication management method performed in a communication management apparatus for performing access control over a plurality of terminal devices, the communication management method comprising:
storing, using at least one processor of the communication management apparatus, in a memory a plurality of group identification information, each of the plurality of group identification information being associated with a group, the group representing an organization or project, each of the plurality of group identification information including identification of at least one terminal device that is a member of the group from among a plurality of terminal devices;
registering, using the at least one processor, based on a registration request received from at least one of the plurality of terminal devices, the plurality of group identification information with the memory in association with conference identification information for identifying a conference, the plurality of group identification information being stored in the memory;
receiving, using the at least one processor, a request to participate in the conference from the at least one terminal device, the request including conference identification information corresponding to the requested conference;
specifying, using the at least one processor, at least two group identification information from the plurality of group identification information to be associated with the received conference identification information;
determining, using the at least one processor, whether each of the at least two specified group identification information is associated with authentication information in the memory;
determining, using the at least one processor, that an input of authentication information is necessary if each of the at least two specified group identification information is determined to be associated with authentication information;
determining, using the at least one processor, that the input of the authentication information is unnecessary if at least one of the at least two specified group identification information is determined to be unassociated with authentication information in the memory;
in response to the determination that the input of the authentication information is necessary based on a result of the input of the authentication information determination, requesting the terminal device to input authentication information, the terminal device having sent the request to participate in the conference; and
wherein in response to the determination that the input of the authentication information is unnecessary, permitting, using the at least one processor, access from all of the plurality of terminal devices associated with the at least two specified group identification information.

9. A communication management system comprising:
a plurality of terminal devices;
a communication management apparatus configured to perform access control over the plurality of terminal devices, the communication management apparatus including, a memory having computer readable instructions stored thereon, and
at least one processor configured to execute the computer readable instructions to,
store in the memory a plurality of group identification information, each of the plurality of group identification information being associated with a group, the group representing an organization or project, each of the plurality of group identification information including identification of at least one terminal device from the plurality of terminal devices that is a member of the group,
where at least one or more of the plurality of group identification information is stored in association with authentication information, and at least one or more of a plurality of pieces of group identification information is stored without being associated with authentication information, register, based on a registration request received from at least one terminal device, the plurality of group identification information with the memory in association with conference identification information for identifying a conference, the plurality of group identification information being stored in the memory, receive a request to participate in the conference from the at least one terminal device, the request including conference identification information corresponding to the requested conference, specify at least two group identification information from the plurality of group identification information to be associated with the received conference identification information, determine whether each of the at least two specified group identification information is associated with authentication information in the memory, determine that an input of authentication information is necessary if each of the at least two specified group identification information is determined to be associated with authentication information, determine that the input of the authentication information is unnecessary if at least one of the at least two specified group identification information is determined to be unassociated with authentication information in the memory, and request, based on results of the determination of that the input of the authentication information is necessary, input of the authentication information from the terminal device having sent the request to participate in the conference; and wherein in response to the determination that the input of the authentication information is unnecessary, permit access from all of the plurality of terminal devices associated with the at least two specified group identification information.

10. The communication management method as claimed in claim 8, wherein when registration of at least one of the plurality of group identification information to be granted access permission is accepted, if the plurality of group identification information includes at least one group identification information for which the authentication information is not set, performing, using the at least one processor, access control to permit access to all of the plurality of terminal devices associated with the at least two specified group identification information.

11. The communication management method as claimed in claim 8, the method further comprising:

accepting, using the at least one processor, registration of a first hierarchical group of terminal devices from the plurality of terminal devices having a hierarchical relationship with a second hierarchical group of terminal devices from the plurality of terminal devices, the first hierarchical group of terminal devices being granted access permission; and wherein if the authentication information is set in association with the first hierarchical group of terminal devices and the second hierarchical group of terminal devices is higher than the first hierarchical group in the group identification information, the method further includes, determining using the at least one processor, that input of the authentication information by at least one terminal device of the first hierarchical group of terminal devices is necessary, and sending, using the at least one processor, a request for the input of the authentication information to the at least one terminal device of the first hierarchical group of terminal devices.

12. The communication management method as claimed in claim 11, wherein if the authentication information is not set in association with the first hierarchical group of terminal devices and the second hierarchical group of terminal devices higher than the first hierarchical group in the group identification information, method further include, using at least one processor, access control to permit access from all of the plurality of terminal devices.

13. The communication management system as claimed in claim 9, wherein when registration of at least one of the plurality of group identification information to be granted access permission is accepted, if the plurality of group identification information includes at least one group identification information for which the authentication information is not set, the at least one processor is configured to perform access control to permit access to all of the plurality of terminal devices.

14. The communication management system as claimed in claim 9, wherein the at least one processor is further configured to: accept registration of a first hierarchical group of the terminal devices having a hierarchical relationship with a second hierarchical group of terminal devices, the first hierarchical group of terminal devices being granted access permission; and wherein if the authentication information is set in association with the first hierarchical group of terminal devices and the second hierarchical group of terminal devices is higher than the first hierarchical group in the group identification information, the at least one processor is configured to determine that input of the authentication information by at least one terminal device of the first hierarchical group of terminal devices is necessary and sends a request for the input of the authentication information to the at least one terminal device of the first hierarchical group of terminal devices.

15. The communication management system as claimed in claim 14, wherein if the authentication information is not set in association with the first hierarchical group of terminal devices and the second hierarchical group of terminal devices higher than the first hierarchical group in the group identification information, the at least one processor is configured to perform access control to permit access from all of the plurality of terminal devices.

* * * * *